United States Patent
Oyarzabal

(10) Patent No.: US 8,601,476 B2
(45) Date of Patent: Dec. 3, 2013

(54) APPLICATION TASK REQUEST AND FULFILLMENT PROCESSING

(75) Inventor: Randy E. Oyarzabal, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 312 days.

(21) Appl. No.: 12/952,415

(22) Filed: Nov. 23, 2010

(65) Prior Publication Data

US 2012/0131580 A1     May 24, 2012

(51) Int. Cl.
*G06F 9/46*     (2006.01)

(52) U.S. Cl.
USPC .......................................................... 718/100

(58) Field of Classification Search
USPC .......................................................... 718/100
See application file for complete search history.

(56) References Cited

U.S. PATENT DOCUMENTS

| | | | |
|---|---|---|---|
| 6,732,277 B1 * | 5/2004 | Vandergeest et al. | 726/19 |
| 7,099,671 B2 * | 8/2006 | Liang | 455/450 |
| 7,143,137 B2 * | 11/2006 | Maufer et al. | 709/205 |
| 7,181,227 B2 * | 2/2007 | Wilson et al. | 455/456.1 |
| 2003/0083095 A1 * | 5/2003 | Liang | 455/552 |
| 2004/0044644 A1 * | 3/2004 | Brady et al. | 707/1 |
| 2005/0108521 A1 * | 5/2005 | Silhavy et al. | 713/156 |
| 2006/0248577 A1 * | 11/2006 | Beghian et al. | 726/5 |
| 2007/0143838 A1 * | 6/2007 | Milligan et al. | 726/15 |
| 2008/0141141 A1 * | 6/2008 | Moore et al. | 715/748 |
| 2009/0083840 A1 * | 3/2009 | Jensen et al. | 726/6 |
| 2010/0205260 A1 * | 8/2010 | Daskalopoulos et al. | 709/206 |
| 2012/0110670 A1 * | 5/2012 | Mont et al. | 726/25 |

* cited by examiner

*Primary Examiner* — Van Nguyen
(74) *Attorney, Agent, or Firm* — Patterson & Sheridan LLP

(57) ABSTRACT

Techniques for fulfilling requests and providing results to a requesting entity. Embodiments may poll a flag to determine when a fulfillment request from a requesting entity is pending. Upon detecting the fulfillment request is pending, embodiments may retrieve the request and perform one or more actions associated with the request to produce a fulfillment result. Embodiments may then store the fulfillment result in a storage location and transmit a notification to the requesting entity to indicate the fulfillment request has been fulfilled.

20 Claims, 4 Drawing Sheets

APPLICATION TASK REQUEST AND FULFILLMENT PROCESSING

BACKGROUND

Embodiments of the invention relate to request processing, and more particularly, to a system for monitoring flags to detect pending requests and for fulfilling such requests.

Modern computer systems are often used by numerous different users. As a result, system security on such a computer system is a high priority, in order to prevent one user from interfering with the work of other users and the operation of the system as a whole, either intentionally or unintentionally. Since various users of the system often have different needs and technical expertise, one common technique for enforcing system security is to assign roles to the users of the system. Each of these roles, in turn, may have certain access privileges which restrict their access to various resources on the computer system and restrict what actions the users may perform on the computer system. However, one disadvantage to such a technique is that occasionally a user may need a task performed that is outside the user's access privileges. In such a scenario, the user may need to manually request that another user perform the task for them. However, such a manual process is often inefficient, as the second user may not be familiar with the specifics of the requested task or may simply be too busy to perform the task immediately. Furthermore, in some situations, may undermine the security of the computer system by allowing the user to effectively circumvent his assigned security role on the computer system.

SUMMARY

Embodiments of the invention provide a method, product and system for fulfilling requests. The method, product and system include polling a flag in a predetermined location to determine whether a fulfillment request is pending to be processed. Upon detecting the fulfillment request is pending, the method, product and system further include retrieving the fulfillment request. Such a fulfillment request may be generated by a requesting entity having a first set of security credentials. The method, product and system also include performing one or more fulfillment actions associated with the fulfillment request to produce fulfillment results. The fulfillment actions are performed using a second set of security credentials. The second set of security credentials are sufficient to perform the fulfillment actions, while the first set of security credentials are insufficient to perform the fulfillment actions. Additionally, the method, product and system include, upon successfully performing the one or more fulfillment actions associated with the fulfillment request, transmitting a notification to the requesting entity indicating the fulfillment request has been fulfilled.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
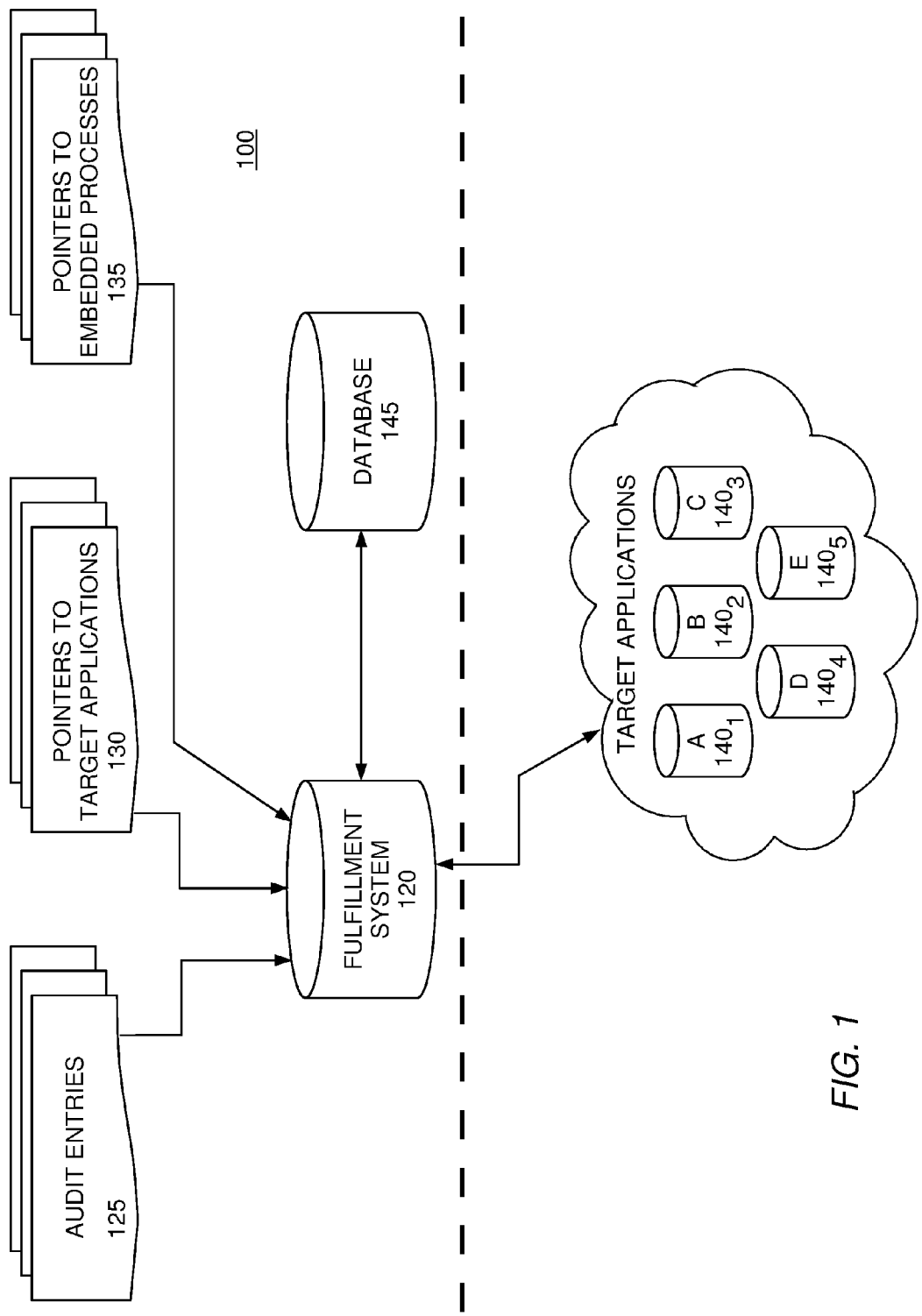
FIG. 1 is a block diagram illustrating a fulfillment system, according to one embodiment of the present invention.

Embodiments of the invention provide techniques for fulfilling requests issued by a requesting entity and providing any results from the request to the requesting entity. Embodiments may poll a flag that indicates whether a request is pending. Upon detecting a request is pending, the request may be retrieved and one or more actions associated with the request may be performed. For example, an exemplary request may be to generate a particular report, and the request may contain certain parameters to be used in generating the report. Additionally, such a request may be issued in an environment using user-based security permissions. For instance, in the above example, the requesting entity may not have access rights to generate the report, and thus may issue the request for processing by a fulfillment system. Upon performing the actions associated with the request, embodiments may store the results generated by the actions in a storage location accessible by the requesting entity. Embodiments may then transmit a notification to the requesting entity, indicating that the request has been fulfilled.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., a target application 140) or related data available in the cloud. For example, the target application 140 could execute on a computing system in the cloud and generate a request to be performed, a request for which neither the user nor the target application 140 has security rights to perform. In such a case, a fulfillment component 280 could poll a flag to detect pending requests, and upon detecting a request, may perform one or more actions associated with the request, using the security credentials of the fulfillment component 280, and store the results of such actions at a storage location in the cloud. Doing so allows a user to access this information from any computing system attached to a network connected to the cloud (e.g., the Internet).

FIG. 1 is a block diagram illustrating a fulfillment system, according to one embodiment of the present invention. As shown, the system 100 includes a fulfillment system 120, which maintains audit entries 125, pointers to target applications 130 and pointers to embedded processes 135. The audit entries 125 generally contain logging data that the fulfillment system 120 or the embedded processes 135 may output when performing one or more operations. The fulfillment system 120 is also communicatively coupled to a database 145. Additionally, the fulfillment system 120 is communicatively coupled to and may interact with a plurality of target applications 140. The fulfillment system 120 may maintain a pointer 130 for each of the target applications 140. Such a pointer may contain information identifying the target application. For example, an application pointer 130 may contain a name for the target application, a location for the target application, a network address for the target application, and a type of the target application.

The embedded processes 135 are generally software modules that the fulfillment system 120 may use in fulfilling requests. In one embodiment, the fulfillment system 120 may provide a plug-in framework through which the embedded processes 135 may connect to the fulfillment system 120. By doing this, embodiments of the invention provide a modular framework through which additional functionality may be added to the fulfillment system (e.g., by dropping in a new embedded process) or may be removed from the fulfillment system (e.g., by removing one of the embedded processes). Advantageously, by doing this, embodiments of the invention may be easily and efficiently customized to fulfill particular tasks specific to their environment.

According to one embodiment of the invention, a target application 140 may generate a fulfillment request and store the request in a location accessible by the fulfillment system 120. The target application 140 may store the request on any medium qualifying as a computer-readable storage medium, as defined above. Such a storage location may be on the computer system running the target application 140, the fulfillment system 120, or generally any other system accessible by the fulfillment system 120. Additionally, the fulfillment request generally specifies one or more tasks to be performed. Examples of fulfillment requests include, without limitation, document generation, report generation, billing statement generation, and data store queries. The fulfillment request may also specify one or more parameters for use in fulfilling the request. For example, a target application 140 may generate a fulfillment request to generate a billing statement, and the request may include parameters such as what products should included in the billing statement, what time period the billing statement should relate to, and what other information should be included in the billing statement.

Upon storing the fulfillment request, the target application 140 may also set a flag to indicate that a fulfillment request has been generated and is ready for processing. Generally, the flag may be any data, either in computer memory or on computer storage, which is capable of indicating that a fulfillment request is pending. For example, in one embodiment of the invention, the flag is a particular field in a database. Continuing this example, database field may be a Boolean field, where a value of "1" indicates a fulfillment request is pending, and a value of "0" indicates no requests are pending. In another embodiment, the flag may not only indicate that a request is pending, but may also contain a location of the request. For example, the flag may be represented by a particular value in a webpage accessible by the fulfillment system 120, and the webpage may further contain a location where an associated fulfillment request is stored on system storage. Of course, the above examples are for illustrative purposes only and are without limitation, and one of ordinary skill in the art will quickly recognize that numerous other examples satisfying the above definition of a flag exist and may be used instead.

The fulfillment system 120 may poll the flag for each of the target applications 140 to determine when the respective application has issued a fulfillment request to be processed. Upon detecting that a fulfillment request is pending, the fulfillment system 120 may retrieve the stored fulfillment request and may invoke one or more embedded processes 135 to perform one or more actions associated with the retrieved fulfillment request. For example, continuing the above example of a fulfillment request to generate a billing statement, the fulfillment system 120 may invoke an embedded process 135 to retrieve data from the database 145 (e.g., by issuing a query against the database 145), and may invoke a second embedded process 135 to then process this data to create a billing statement. Such embedded processes 135 may be local to the computer system hosting the fulfillment system 120. In one embodiment, embedded processes 135 may be applications external to the fulfillment system 120. Furthermore, as discussed above, the fulfillment request may contain one or more parameters for use in processing the request. Thus, for example, the request to generate the billing statement may include parameters specifying a time range for values to include in the billing statement. The fulfillment system 120 may then communicate these parameters to the corresponding embedded process 135 tasked with generating the billing statement.

Once the request has been fulfilled (e.g., the billing statement is generated), the fulfillment system 120 may store the results of the request (e.g., the billing statement) at a storage location accessible by the target application that generated the request. Similar to the storage location for the request discussed above, the storage location for the results may generally be any computer-readable storage medium accessible by the target application that generated the request. One the results are stored, the fulfillment system 120 may then generate and transmit a notification to the requesting target application, indicating that the fulfillment system 120 has fulfilled the request and that the results are now available.

Advantageously, the system 100 enables the automatic fulfillment of requests generated by the target applications 140. Furthermore, another advantage provided by the system 100 is that users and target applications 140 without sufficient security credentials to perform a particular request may still submit such a request to the fulfillment system 120 for processing. This may be beneficial, for instance, in a situation where the target applications 140 do not have the ability to fulfill the requests themselves. For example, in the above example, a target application 140 may not have physical access to the database 145 (e.g., no network route exists between the system running the database 145 and the system running the target application 140). As a second example, the target application 140 may not have access rights to access the database. In either situation, the system 100 enables the target application 140 to issue a request to have actions performed that the application 140 itself would be unable to perform.

To this end, embodiments of the invention prevent the need for the users or target applications 140 to manually attempt to circumvent the security restrictions of the database 145. For example, currently a user using a target application that wishes to generate a billing statement, but who does not have access to generate the billing statement himself, may need to contact a database administrator directly (e.g., through an email message) and request that the administrator prepare the billing statement manually. However, such a manual process is often inefficient for all the parties involved. As such, embodiments of the invention enables users to issue requests that the users would otherwise be unable to perform themselves, and improve the efficiency of the request process by automatically processing such requests.

As a further advantage, the system 100 consolidates request processing to a single set of security credentials. For example, assume a particular request requires administrator access to the database 145 to perform. In such a scenario, it may be undesirable to grant each target application 140 administrator access to the database 145, since administrator access may grant many more privileges to the target applications 140 than required, and thus such actions may reduce the security level of the database 145 as a whole. However, by processing all the requests using the fulfillment system 120, the system 100 consolidates the grant of administrator access to the database 145 to a single system (i.e., the fulfillment system 120). As such, the type and scope of requests that may be issued against the database 145 may be regulated at a single point (i.e., the fulfillment system 120). Accordingly, the system 100 improves the security of the database 145 by consolidating any grant of database access rights.

As yet another advantage, the system 100 provides a modular framework through the use of embedded processes 135. Such a modular design is beneficial, as it enables developers to easily and efficiently add, remove or modify the functionality of the fulfillment system 120. For example, if the software developers determine that additional functionality is needed (e.g., if the fulfillment system 120 needs to be able to process a new type of request), the developers may create a new embedded process 135 to perform the additional functionality and connect such a process 135 to the fulfillment system 120. By doing this, embodiments enable the efficient addition of new functionality to the fulfillment system 120, without requiring the modification or recompilation of the source code of the fulfillment system 120.

Figure 2:
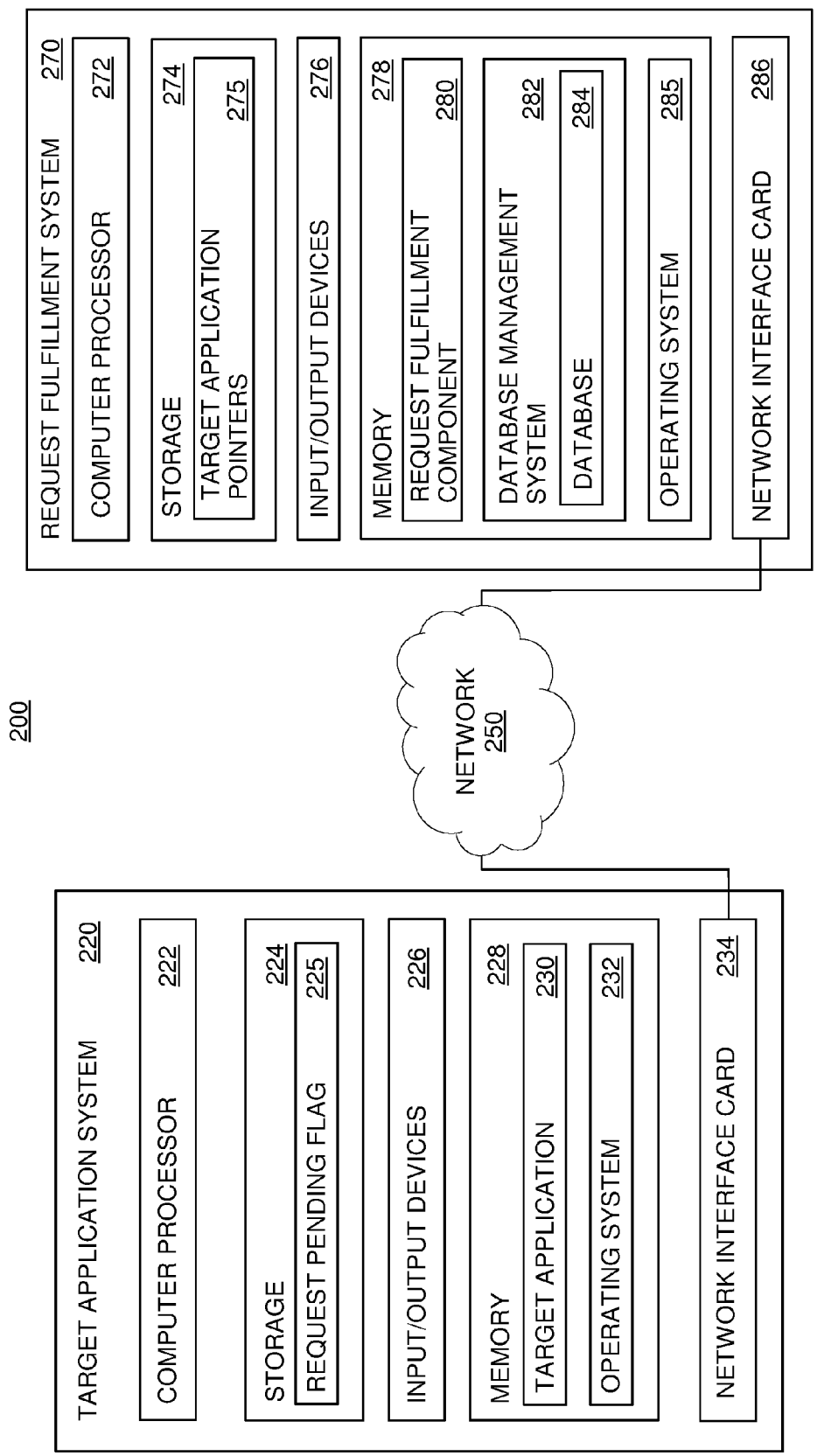
FIG. 2 is a block diagram illustrating a system configured to run a request fulfillment component, according to one embodiment of the present invention.

FIG. 2 is a block diagram illustrating a system configured to run a request fulfillment component, according to one embodiment of the present invention. As shown, the system 200 includes a target application system 220 and a request fulfillment system 270, communicatively coupled via a network 250. The target application system 220 includes, without limitation, a central processing unit (CPU) 222, system storage 224, I/O devices 226, a memory 228, and a network interface card 234. I/O devices 226 may represent a variety of input and output devices, including keyboards, mice, visual displays, printers and so on. The target application system 220 may connect to the network 250 (e.g., the Internet) using the network interface 234.

The CPU 222 generally retrieves and executes programming instructions stored in the memory 228. Similarly, the CPU 222 stores and retrieves application data residing in the memory 228. An interconnect (not shown) may be used to transmit programming instructions and application data between the CPU 222, storage 224, I/O devices 226, network interface 234, and memory 228. CPU 222 is included to be representative of a single CPU, multiple CPUs, a single CPU having multiple processing cores, and the like. Furthermore, CPU 222 may be any processor capable of performing the functions described herein. Although memory 228 is shown as a single entity, memory 228 may include one or more memory devices having blocks of memory associated with physical addresses, such as random access memory (RAM), read only memory (ROM), flash memory or other types of volatile and/or non-volatile memory. Storage 224, such as a hard disk drive, solid state device (SSD), or flash memory storage drive, may store non-volatile data. Furthermore, as will be understood by one of ordinary skill in the art, any computer system capable of performing the functions described herein may be used.

In the pictured embodiment, memory 228 contains a target application 140 and an operating system 232. The target application 140, as discussed above, may generate fulfillment requests to be processed by the request fulfillment component 280. Additionally, as shown, storage 224 contains a request pending flag 225. When the target application 140 generates such a request, the target application 140 may set the request pending flag 225 to indicate the fulfillment request is pending. Such a flag 225 may be a value contained in the memory 228, in storage 224, or on any external system or media accessible by the request fulfillment component 280. Generally, the operating system 225 may be any operating system capable of performing the functions described herein.

Similarly, the request fulfillment system 270 includes, without limitation, a central processing unit (CPU) 272, system storage 274, I/O devices 276, a memory 278, and a network interface card 286. I/O devices 276 may represent a variety of input and output devices, including keyboards, mice, visual displays, printers and so on. The request fulfillment system 270 may connect to the network 250 and communicate with the target application system 220 using the network interface 234.

The CPU 272 generally retrieves and executes programming instructions stored in the memory 278. Similarly, the CPU 272 stores and retrieves application data residing in the memory 228. An interconnect (not shown) may be used to transmit programming instructions and application data between the CPU 272, storage 274, I/O devices 276, network interface 286, and memory 278. CPU 272 is included to be representative of a single CPU, multiple CPUs, a single CPU having multiple processing cores, and the like. Furthermore, CPU 272 may be any processor capable of performing the functions described herein. Although memory 278 is shown as a single entity, memory 278 may include one or more memory devices having blocks of memory associated with physical addresses, such as random access memory (RAM), read only memory (ROM), flash memory or other types of volatile and/or non-volatile memory. Storage 274, such as a hard disk drive, solid state device (SSD), or flash memory storage drive, may store non-volatile data. Furthermore, as will be understood by one of ordinary skill in the art, any computer system capable of performing the functions described herein may be used.

Additionally, storage 274 contains target application pointers 275, each of which relates to a particular target application 140. Generally, a target application pointer 275 may contain information which describes and identifies a particular target application 140. For example, a target application pointer 275 may contain a geographic location where the target application is housed, a name for the target application, a network address of the target application, and a type of the target application. The target application pointer 275 may also contain information such as a location of where a target application 140 stores its request pending flag 225, where the target application 140 stores pending requests, and where results of processing requests submitted by the target application 140 should be stored In the pictured embodiment, memory 278 contains a request fulfillment component 280, a database management system 282 (hereinafter referred to as a "DBMS") and an operating system 285. The request fulfillment component 280, as discussed above, may generally detect and fulfill requests generated by the target application 140. Furthermore, the request fulfillment component 280 may poll the request pending flag 225 on the target application system 220 to detect when a fulfillment request is pending. The request fulfillment component 280 may then transmit a notification to the target application 140, indicating that the request has been fulfilled. Generally, the operating system 225 may be any operating system capable of performing the functions described herein.

Memory 278 also contains a DBMS 282, which in turn contains a database 284. In processing certain requests, the request fulfillment component 280 may interact with the DBMS 282 to extract data from or manipulate data in the database 284. As an example, assume that the target application 140 has insufficient security credentials to request a particular report from the DBMS 282, based on data contains in the database 284. In such an example, the target application 140 may create a fulfillment request for such a report to be generated. Such a request may include certain parameters for use in the generation of the report. For example, the request may specify various types of data to be included in the report, and may specify a particular time range in which the data should fall. Upon generating the fulfillment request, the target application 140 may store the request in a predetermined location accessible by the request fulfillment component 280 (e.g., a shared location in storage 224). The target application 140 may then modify the request pending flag 225 to indicate that a fulfillment request is pending.

As discussed above, the request fulfillment component 280 may periodically poll the request pending flag 225 to detect pending requests. Upon detecting that the request pending flag 225 has been modified by the target application 140, the request fulfillment component 280 retrieves the fulfillment request from the predetermined storage location. The request fulfillment component 280 may then perform one or more actions associated with the request. Thus, in the current example, the request fulfillment component 280 may query the DBMS 282 to retrieve particular data from the database 284, and may generate a report using the retrieved data. In the event the target application 140 included one or more parameters in the request (e.g., a time range in which data values should fall), the request fulfillment component 280 may modify the report accordingly (e.g., by limiting the query to retrieve only data values falling within the specified time range).

Furthermore, as discussed above, in one embodiment the request fulfillment component 280 may provide a modular framework through which one or more embedded processes 135 may connect to the request fulfillment component 280. In such an embodiment, the request fulfillment component 280 may task a first embedded process 135 with retrieving the particular data from the database 284, and may then use a second embedded process 135 to generating a report using the retrieved data. By providing such a modular framework and using embedded processes 135, embodiments enable the efficient addition, removal or modification of the fulfillment system.

Upon generating the report, the request fulfillment component 280 may store the report in a location accessible by the target application 140 (e.g., a shared location in storage 274). Upon storing the report, the request fulfillment component 280 may generate and transmit a notification to the target application 140, indicating that the request has been fulfilled. In one embodiment, the request fulfillment component 280 notifies the target application 140 that the request is fulfilled by setting a flag (e.g., a request fulfilled flag in storage 274) which the target application 140 periodically polls. In another embodiment, the request fulfillment component 280 may generate an electronic message (e.g., an email message or an instant message) and transmit the generated message to the target application 140 to indicate the request has been fulfilled. The target application 140 may then retrieve the stored report.

As such, embodiments of the invention enable the target application 140 to generate a request for processing by the request fulfillment component 280 and then to receive the results of the processing. Advantageously, embodiments may enable a target application 140 to have requests processed that the target application 140 itself would be unable to process. For example, in the above example of the target application 140 creating a fulfillment request to generate a report using data in the database 284, the target application 140 may have been unable to access the database 284 directly. For example, there may not be a network route from the target application 140 to the DMBS 282 (e.g., due to a firewall on the request fulfillment system 270 blocking external traffic to the port the DBMS 282 is listening on). As a second example, the target application 140 may simply lack the security credentials to access all or part of the data in the database 284 needed to generate the report. In either scenario, by using embodiments of the invention, the target application 140 may still obtain the generated report, even though the target application 140 lacks a network route to the DBMS 282, and even though the target application 140 lacks the security credentials to generate the report itself.

Figure 3:
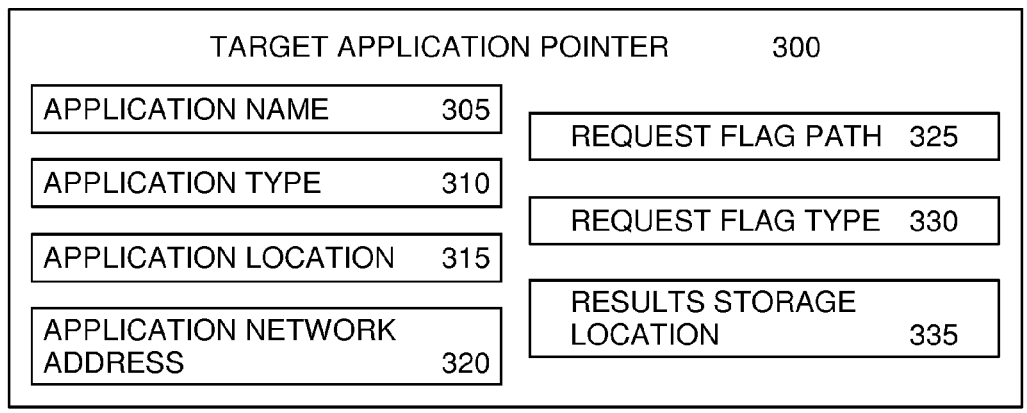
FIG. 3 is a block diagram illustrating a target application pointer, according to one embodiment of the present invention.

FIG. 3 is a block diagram illustrating a target application pointer, according to one embodiment of the present invention. As shown, the target application pointer 300 contains an application name 305, an application type 310, an application location 315, and an application network address 320. The application name 305 generally includes identification information for the target application. For example, a particular target application may have the application name 305 "ClientApplication_#8", which designates the application as the eighth instance of a client application. Of course, such an example is for illustrative purposes, and one of ordinary skill in the art will quickly recognize that any naming convention providing identification information for a target application may be used instead.

The target application pointer 300 also contains an application type 310. For example, "MarketingClient" and "TechSupportClient" are two exemplary application types 310. In one embodiment, the request fulfillment component 280 may use the application type 310 to interpret other information associated with the target application. For example, while both the MarketingClient and TechSupportClient types of applications may issue a billing statement request, the request fulfillment component 280 may generate a different billing statement for each of these respective application types. Accordingly, when the request fulfillment component 280 detects that a request is pending, the request fulfillment component 280 may look to the application type 310 for the target application generating the request in order to properly process the request.

The application location 315 generally contains geographic information regarding the target application. For example, although there may be two instances of the same application, these applications may be running on computer systems in separate geographic locations. As such, the request fulfillment component 280 may use the application location 315 to differentiate between two target applications. Additionally, the application network address 320 may be further used to differentiate between two target applications. For example, although two instances of the same application may be hosted at the same geographic location, each of these instances of the application may be associated with a different network address. In such a scenario, the request fulfillment component 280 may use the network address 320 of each target application to distinguish between the two.

The target application pointer 300 also contains a request flag path 325, a request flag type 330 and a results storage location 335. The request flag path 325 may include information such as a filesystem path and a filename for the request flag. In another embodiment where the request flag is represented by a value in a database, the request flag path 325 may include a database name, a table name within the database, and a field within the table. The request flag type 330 may include information designating a type for the request flag. The request fulfillment component 280 may use such information when polling to interpret the meaning of the flag. For example, one type of request flag may use the states "0" and "1" to indicate not pending and pending, respectively, while another type of request flag may use the states "NOT PENDING" and "PENDING" to indicate the same. As such, the request fulfillment component 280 may use the request flag type 330 to interpret a meaning of a request flag for a particular target application. The results storage location 335 generally specifies a location where any results created by processing a request should be stored. In one embodiment, the results storage location 335 includes a filesystem path and a filename for storing the results.

Figure 4:
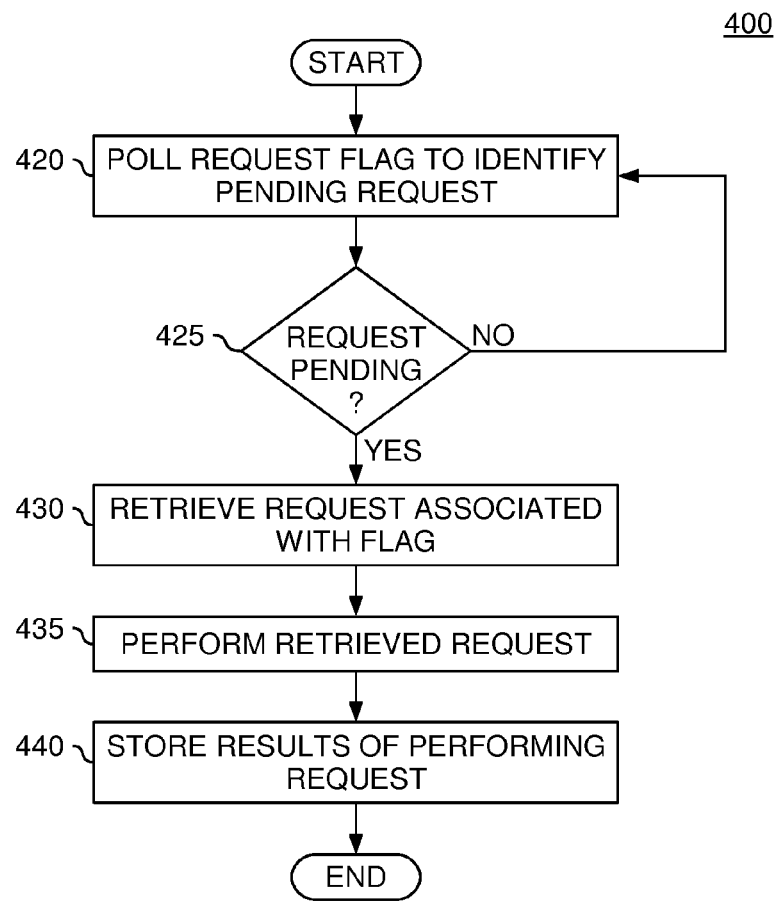
FIG. 4 is a flow diagram illustrating a method for fulfilling requests, according to one embodiment of the present invention.

FIG. 4 is a flow diagram illustrating a method for fulfilling requests, according to one embodiment of the present invention. As shown, the method 400 begins at step 420, where request fulfillment component 280 polls a request flag for a particular target application 140 to identify pending requests. In one embodiment, the request flag is stored in system storage on the computer system running the target application (e.g., the request pending flag 225 in storage 224). The request fulfillment component 280 then determines whether a request is pending for the particular target application 140 (step 425). If no request is pending, the method 400 returns to step 420, where the request fulfillment component 280 again polls the request flag to determine if a request is currently pending from the particular target application 140.

If instead the request fulfillment component 280 determines a request is pending, the request fulfillment component 280 retrieves the request associated with the request flag (step 430). The request fulfillment component 280 then processes the retrieved request (step 435). In one embodiment, the request may include information specifying the type of the request. For example, a request to refresh the content of a particular database may include information indicating that it is of the "DATABASE_REFRESH" type of request. The request may also contain one or more parameters containing information associated with processing the request. As an example, the above database refresh request may contain database identification information which specifies which database should be updated. As a second example, for a request to extract data from a database, the request may specify particular information to extract from the database. In one embodiment, the request fulfillment component 280 may be configured with certain default values for one or more requests, such that the default values are used when no parameters are specified for the request. For example, if the request fulfillment component 280 retrieves a database refresh request, the request fulfillment component 280 may default to refreshing the content in a particular database, unless a parameter is specified with the request to specify a different database to refresh.

Additionally, in one embodiment, the request fulfillment component 280 is configured to use one or more embedded processes 135 in processing the request. In such an embodiment, upon receiving the database refresh request, the request fulfillment component 280 may use a particular embedded process 135 to perform the database refresh. In a case where the received request contains one or more parameters, the request fulfillment component 280 may transmit such parameters to the embedded processes 135 used in processing the request. For example, using the above example of a database refresh request containing database identification information, the request fulfillment component 280 may invoke a particular embedded process 135 to refresh the database. As part of such invocation, the request fulfillment component 280 may transmit the database identification information to the particular embedded process 135, specifying which database the embedded process 135 should refresh.

Once the request fulfillment component 280 processes the request, the request fulfillment component 280 stores the results of performing the request (step 440). Generally, the request fulfillment component 280 may store the results at any storage location accessible by the target application 140. Additionally, the request fulfillment component 280 may transmit a notification to the target application 140, indicating that the request has been fulfilled and that the results are available. In one embodiment, the notification may also contain a location where the request fulfillment component 280 stored the results. Once the results are stored, the method 400 ends.

Figure 5:
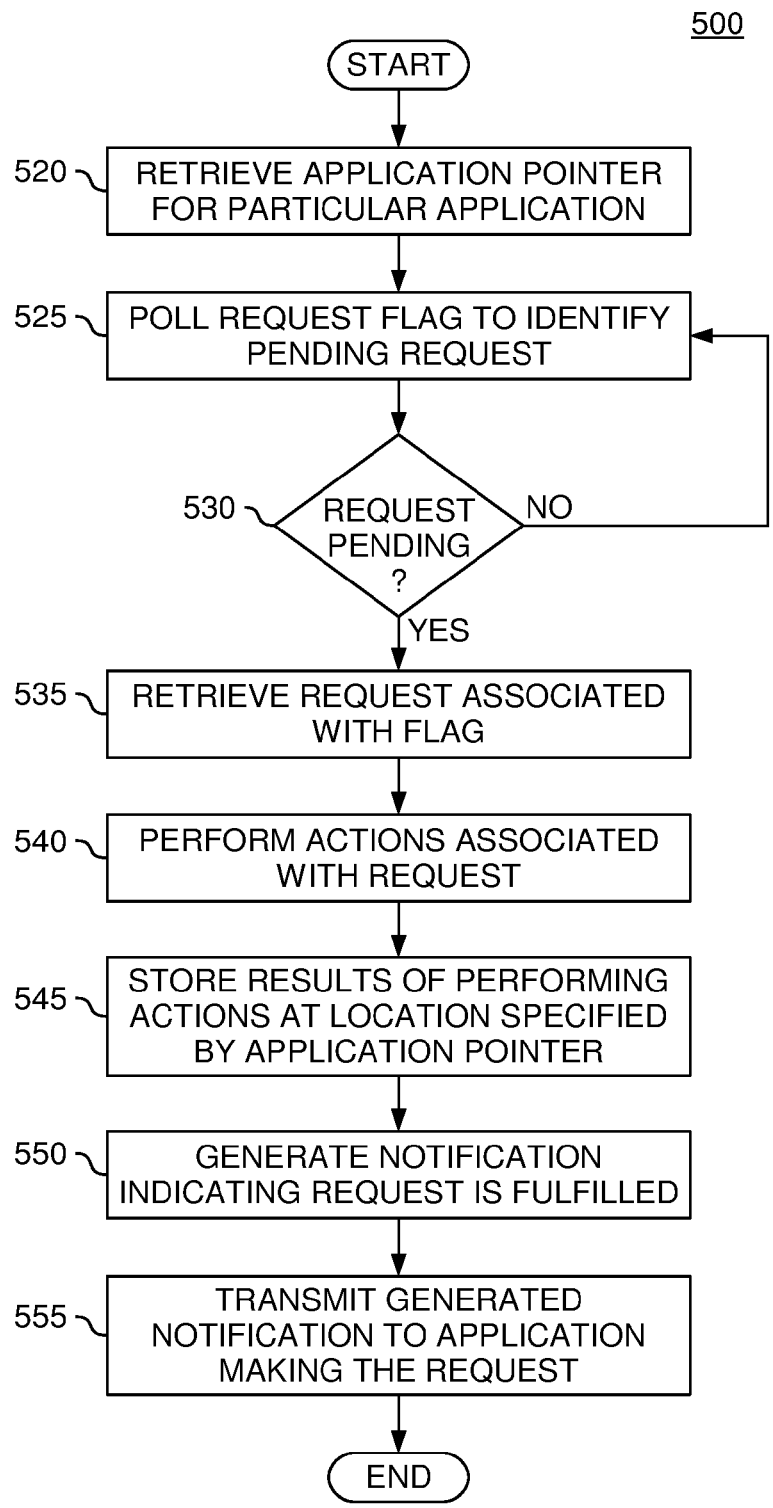
FIG. 5 is a flow diagram illustrating a method for fulfilling requests, according to one embodiment of the present invention.

FIG. 5 is a flow diagram illustrating a method for fulfilling requests, according to one embodiment of the present invention. As shown, the method 500 begins at step 520, where the request fulfillment component 280 retrieves an application pointer for a particular target application. The request fulfillment component 280 may use the application pointer to determine information about the particular target application, such as the type of the application and where the application stores its request pending flag. The request fulfillment component 280 may then poll the request pending flag for the particular application to determine whether a request from the particular application is pending (step 525). If the request fulfillment component 280 determines no request is currently pending, the method 500 returns to step 525, where the request fulfillment component 280 again polls the request pending flag to determine if a request is pending.

If instead the request fulfillment component 280 determines that a request is pending, the request fulfillment component 280 retrieves the request associated with the request pending flag (step 535). Of note, since a single target application may issue different types of requests, a single target application may be associated with multiple request pending flags (e.g., one for each type of request). Upon retrieving the request, the request fulfillment component 280 performs one or more actions associated with the retrieved requests (step 540). As discussed above, such actions may include, without limitation, generating a document, generating a report, generating a billing statement and retrieving data from a data store.

Once the actions associated with the request are performed, the request fulfillment component 280 stores the results produced by the actions. Furthermore, the request fulfillment component 280 may preferably store the results at a storage location accessible by the target application 140 from which the request originated. Thus, as an example, for a request to generate a particular document, the request fulfillment component 280 may generate the document and may store the document at a storage location accessible by the target application 140. In one embodiment, such a location is a predetermined location. In a second embodiment, the retrieved application pointer for the particular application specifies a location in which results are to be stored. In another embodiment, the request may include a parameter indicating a location in which results are to be stored.

Once the results are stored, the request fulfillment component 280 generates a notification indicating that the request is fulfilled (step 550). Such a request may specify the location where the results were stored, and may further include a link through which the results may be accessed. Upon generating the notification, the request fulfillment component 280 transmits the notification to the target application 140 from which the request originated. Once the notification is transmitted, the method 500 ends.

In certain situations, the actions associated with the fulfillment request performed by the request fulfillment component 280 may fail to complete. As an example, in processing an exemplary request, the request fulfillment component 280 may extract data values from a particular database. However, if the particular database is offline or otherwise unavailable at that time, the request fulfillment component 280 may be unable to extract the necessary data values. In an embodiment where the request fulfillment component 280 is configured to use one or more embedded processes 135 in processing requests, the embedded processes 135 may communicate an error message back to the request fulfillment component 280 when one or more operations fail to complete. The request fulfillment component 280 may be configured to generate a notification indicating that the request processing has failed. The request fulfillment component 280 may then transmit the notification to the target application 140 from which the request originated.

In one embodiment, the request fulfillment component 280 may be configured to re-attempt processing the request, after the first attempt fails. The request fulfillment component 280 may be configured to re-attempt processing the request periodically (e.g., every hour), until the request successfully completes. In such an embodiment, the request fulfillment component 280 may transmit a notification to the target application 140 indicating that the processing of the request will be delayed. In one embodiment, the request fulfillment component 280 is further configured with a maximum number of retries, such that if that request fails to complete within the maximum number of retries, the request fulfillment component 280 may stop retrying the request and may transmit a notification to the target application 140 indicating that the request processing has failed.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method for fulfilling requests, comprising:
    polling a flag in a predetermined location to determine whether a fulfillment request is pending to be processed;
    upon detecting the fulfillment request is pending, retrieving the fulfillment request, wherein the fulfillment request is generated by a requesting entity having a first set of security credentials;
    performing one or more fulfillment actions associated with the fulfillment request to produce fulfillment results, by operation of one or more computer processors, wherein the fulfillment actions are performed using a second set of security credentials, and wherein the first set of security credentials are insufficient to perform the fulfillment actions; and
    upon successfully performing the one or more fulfillment actions associated with the fulfillment request, transmitting a notification to the requesting entity indicating the fulfillment request has been fulfilled.

2. The computer-implemented method of claim 1, wherein the requesting entity is a software application, and further comprising:
    retrieving an application pointer specifying information about the requesting entity, wherein the application pointer specifies at least the predetermined location for polling and the first storage location for storing the fulfillment results.

3. The computer-implemented method of claim 2, wherein the application pointer includes at least one of (i) a geographic location for the requesting entity, (ii) a name for the requesting entity, (iii) a network address for the requesting entity, and (iv) a type of the requesting entity.

4. The computer-implemented method of claim 1, wherein the fulfillment actions comprise at least one of (i) generating a report, (ii) generating a document, (iii) generating a billing statement, and (iv) issuing a query against a data store.

5. The computer-implemented method of claim 1, wherein performing one or more fulfillment actions associated with the fulfillment request to produce fulfillment results, further comprises:
    invoking one or more embedded processes, wherein each of the one or more embedded processes is configured to perform at least one fulfillment action associated with the fulfillment request.

6. The computer-implemented method of claim 1, further comprising:
    storing the fulfillment results in a first storage location, wherein the first storage location is accessible by the requesting entity.

7. The computer-implemented method of claim 1, further comprising:
    upon determining that performing the one or more fulfillment actions associated with the fulfillment request has failed, transmitting a second notification to the requesting entity indicating the fulfillment request has not been fulfilled, wherein the second notification includes an explanation of the failure.

8. A computer program product for fulfilling requests, comprising:
    a computer-readable memory having computer readable program code embodied therewith, the computer readable program code comprising:
        computer readable program code to poll a flag in a predetermined location to determine whether a fulfillment request is pending to be processed;
        computer readable program code to, upon detecting the fulfillment request is pending, retrieve the fulfillment request, wherein the fulfillment request is generated by a requesting entity having a first set of security credentials;
        computer readable program code to perform one or more fulfillment actions associated with the fulfillment request to produce fulfillment results, wherein the fulfillment actions are performed using a second set of security credentials, and wherein the first set of security credentials are insufficient to perform the fulfillment actions; and computer readable program code to, upon successfully performing the one or more fulfillment actions associated with the fulfillment request, transmit a notification to the requesting entity indicating the fulfillment request has been fulfilled.

9. The computer program product of claim 8, wherein the requesting entity is a software application, and further comprising:

computer readable program code to retrieve an application pointer specifying information about the requesting entity, wherein the application pointer specifies at least the predetermined location for polling and the first storage location for storing the fulfillment results.

10. The computer program product of claim 9, wherein the application pointer includes at least one of (i) a geographic location for the requesting entity, (ii) a name for the requesting entity, (iii) a network address for the requesting entity, and (iv) a type of the requesting entity.

11. The computer program product of claim 8, wherein the fulfillment actions comprise at least one of (i) generating a report, (ii) generating a document, (iii) generating a billing statement, and (iv) issuing a query against a data store.

12. The computer program product of claim 8, wherein the computer readable program code to perform one or more fulfillment actions associated with the fulfillment request to produce fulfillment results, further comprises:

computer readable program code to invoke one or more embedded processes, wherein each of the one or more embedded processes is configured to perform at least one fulfillment action associated with the fulfillment request.

13. The computer program product of claim 8, further comprising:

computer readable program code to store the fulfillment results in a first storage location, wherein the first storage location is accessible by the requesting entity.

14. The computer program product of claim 8, further comprising:

computer readable program code to, upon determining that performing the one or more fulfillment actions associated with the fulfillment request has failed, transmit a second notification to the requesting entity indicating the fulfillment request has not been fulfilled, wherein the second notification includes an explanation of the failure.

15. A system, comprising:
a computer processor; and
a memory containing a program that, when executed on the computer processor, performs an operation for fulfilling requests, comprising:

polling a flag in a predetermined location to determine whether a fulfillment request is pending to be processed;

upon detecting the fulfillment request is pending, retrieving the fulfillment request, wherein the fulfillment request is generated by a requesting entity having a first set of security credentials;

performing one or more fulfillment actions associated with the fulfillment request to produce fulfillment results, by operation of one or more computer processors, wherein the fulfillment actions are performed using a second set of security credentials, and wherein the first set of security credentials are insufficient to perform the fulfillment actions; and upon successfully performing the one or more fulfillment actions associated with the fulfillment request, transmitting a notification to the requesting entity indicating the fulfillment request has been fulfilled.

16. The system of claim 15, wherein the requesting entity is a software application, and the operation further comprising:

retrieving an application pointer specifying information about the requesting entity, wherein the application pointer specifies at least the predetermined location for polling and the first storage location for storing the fulfillment results.

17. The system of claim 16, wherein the application pointer includes at least one of (i) a geographic location for the requesting entity, (ii) a name for the requesting entity, (iii) a network address for the requesting entity, and (iv) a type of the requesting entity.

18. The system of claim 15, wherein the fulfillment actions comprise at least one of (i) generating a report, (ii) generating a document, (iii) generating a billing statement, and (iv) issuing a query against a data store.

19. The system of claim 15, wherein performing one or more fulfillment actions associated with the fulfillment request to produce fulfillment results, further comprises:

invoking one or more embedded processes, wherein each of the one or more embedded processes is configured to perform at least one fulfillment action associated with the fulfillment request.

20. The system of claim 15, the operation further comprising:

upon determining that performing the one or more fulfillment actions associated with the fulfillment request has failed, transmitting a second notification to the requesting entity indicating the fulfillment request has not been fulfilled, wherein the second notification includes an explanation of the failure.

* * * * *